United States Patent
Figura

(10) Patent No.: US 10,371,315 B1
(45) Date of Patent: Aug. 6, 2019

(54) MOUNTING BRACKET FOR USE ON BOAT DOCKS

(71) Applicant: John Figura, Defiance, MO (US)

(72) Inventor: John Figura, Defiance, MO (US)

( * ) Notice: Subject to any disclaimer, the term of this patent is extended or adjusted under 35 U.S.C. 154(b) by 0 days.

(21) Appl. No.: 15/915,546

(22) Filed: Mar. 8, 2018

(51) Int. Cl.
| | |
|---|---|
| *F16M 13/02* | (2006.01) |
| *B63B 21/08* | (2006.01) |
| *F16B 2/06* | (2006.01) |
| *E02B 3/20* | (2006.01) |

(52) U.S. Cl.
CPC ............ *F16M 13/02* (2013.01); *F16B 2/06* (2013.01); *B63B 21/08* (2013.01); *E02B 3/20* (2013.01)

(58) Field of Classification Search
CPC .......... F16M 13/02; F16B 2/06; B63B 21/08; E02B 3/20; G09F 2007/1804; G09F 2007/1817; A01M 31/02
USPC ......... 248/316.1, 216.1, 216.4, 218.4, 219.4, 248/219.3
See application file for complete search history.

(56) References Cited

U.S. PATENT DOCUMENTS

| | | | | | |
|---|---|---|---|---|---|
| 2,705,603 | A * | 4/1955 | Bitz | ...................... | H01Q 1/1228 24/332 |
| 2,965,064 | A * | 12/1960 | Wallace | .................. | B63B 21/00 114/216 |
| 4,037,810 | A * | 7/1977 | Pate | ........................ | F16L 3/222 248/68.1 |
| 4,860,985 | A * | 8/1989 | Olson | ................... | F21V 21/116 248/229.17 |
| 6,262,691 | B1 * | 7/2001 | Austin | ................. | H01Q 1/1221 343/878 |
| 6,664,937 | B2 * | 12/2003 | Vermette | .............. | H01Q 1/1228 248/278.1 |
| 9,966,649 | B2 * | 5/2018 | Christie | ............... | F16M 13/022 |
| 2010/0025559 | A1* | 2/2010 | Rathbone | ............. | H01Q 1/1228 248/534 |

* cited by examiner

*Primary Examiner* — Anita M King
(74) *Attorney, Agent, or Firm* — Sandberg Phoenix & von Gontard P.C.

(57) ABSTRACT

A mounting bracket (10) for mounting items (I) on a metal post (P) located on a boat dock (D). A support member (12) allows a user to position the bracket where an item is to be mounted on a post with a pair of clamps (14a, 14b) then being used to affix the item to the bracket. The support member has a set (13) of teeth (T) formed at each end (12e) which bite into, but do penetrate through, the post. When the clamps are attached to the support member, tightening down of the clamps causes the teeth to bite into the post to hold the mounting bracket securely in place, but this does not result in holes being made in the side of the post which might later result in corrosion.

4 Claims, 2 Drawing Sheets

MOUNTING BRACKET FOR USE ON BOAT DOCKS

CROSS-REFERENCE TO REFERENCE TO RELATED APPLICATIONS

None

STATEMENT REGARDING FEDERALLY SPONSORED RESEARCH OR DEVELOPMENT

N/A

BACKGROUND OF THE INVENTION

This invention is directed to mounting brackets; and, more particularly, to brackets used to mount objects on or about docks or other structures adjacent bodies of fresh and salt water so to prevent corrosion of the structures during and after installation of the items.

Many, if not most, structures erected on or near water are made of metal. These include docks, ramps, walkways, steps and stairs, etc. It is also commonplace to mount various items such as lights, signage, speakers, monitoring devices, etc., on the structures, the items being mounted permanently or temporarily in place. Heretofore, many of these items are installed by drilling holes into the structure and then attaching the item in place using screws or bolts. People who construct or use these structures do not like to drill holes in them because drilling holes in a metal support leaves an opening in the support which, over time, is exposed to moisture from rain, the body of water adjacent the structure which is splashed onto it by wave action, or by people getting out of the water and moving about the structure, humidity in the air, etc. Over time, the resulting corrosion will weaken the structure as well as causing it to have an unsightly appearance due to rust streaks.

It would be advantageous thereof to provide a mounting mechanism which will not only properly secure or affix an item in place on the structure while, in doing so, not require holes being made in it.

BRIEF SUMMARY OF THE INVENTION

The present invention is directed to a mounting bracket used to secure items to a dock or other structure situated on or near a body of water. The mounting bracket is sized to accommodate a variety of items of different sizes and shapes and affix them securely in place.

The mounting bracket does not require making holes in the dock or other structure allowing the bracket to be used with metal posts and beams to hold an item in place without the need for unsightly holes which, over time, allow the post or beam to rust.

The mounting bracket comprises three pieces; a pair of detachable clamps and a support member. The support member allows a user to position the bracket where an item is to be mounted on a post or beam with one or both of the clamps then being used to affix the item to the bracket. The support member has a set of teeth formed at each end which bite into, but not through a metal post or beam. When the clamps are attached to the support member, tightening down of the clamps cause the teeth to bite into the post or beam to hold the mounting bracket securely in place.

The mounting bracket, which is available in different sizes, is of a lightweight metal construction for the mounting bracket to be readily carried by a workman and readily used to mount an item in place.

Other objects and features will be in part apparent and in part pointed out hereinafter.

BRIEF DESCRIPTION OF THE SEVERAL VIEWS OF THE DRAWINGS

The accompanying figures, together with detailed description which follows, form part of the specification and illustrate the various embodiments described in the specification.

Corresponding reference characters indicate corresponding parts throughout the several views of the drawings.

DETAILED DESCRIPTION OF INVENTION

Figure 1:
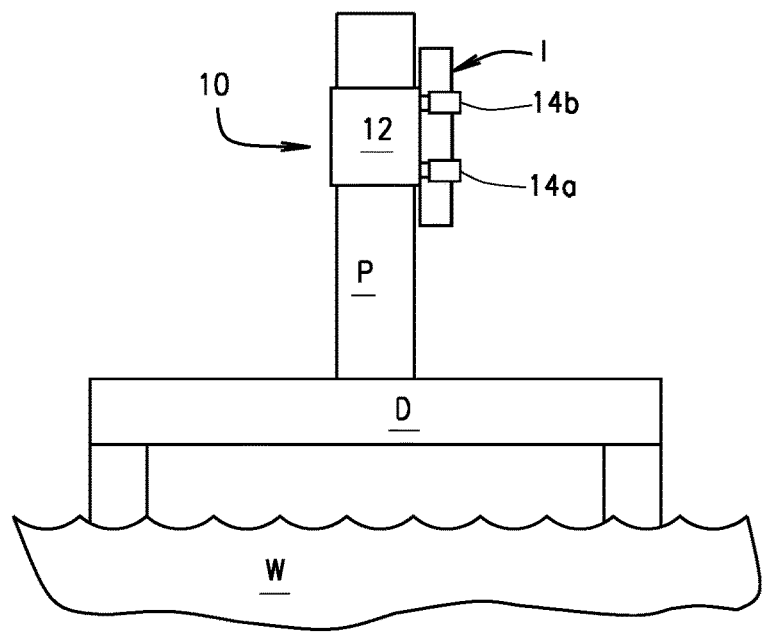
FIG. 1 is a simplified representation of a dock on which a mounting bracket of the present invention is used to install an item in place on the dock.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the described system and method is not limited in its application to the details of construction and the arrangement of components set forth in the following description or illustrated in the drawings. The described system and method is capable of other embodiments and of being practiced or carried out in various ways. Also, it will be understood that the phraseology and terminology used herein is for the purpose of description and should not be regarded as limiting.

In view of the above, it will be seen that the several objects and advantages of the present disclosure have been achieved and other advantageous results have been obtained.

Referring to the drawings, a dock D located adjacent a body of water W has a post P located on it to which an item I is to be mounted. Item I can be one of a number of items including, signage, loud speakers, AEDs, monitoring or security devices, etc. Post P is usually round or square in cross-section and is of a thin wall metal construction. Because of this, it is important that when item I is mounted on or to the post, that holes are not formed in it by which water might flow into the openings and result in corrosion. Although not described herein, those skilled in the art will appreciate that in addition to posts, other structural metal components such as beams, etc., similarly need to be protected.

A mounting bracket 10 of the present invention provides this protection while insuring that an item mounted on the dock is securely affixed in place. Mounting bracket 10 comprises a support member 12 having an elongated generally flat base 12b, and sidewalls 12s and end walls 12e which extend generally straight down from the sides and ends of the support member. A lower end 12u of each sidewall 12s folds underneath base 12b throughout the length of the support member, and each end wall 12e (only one of which is shown in the drawings) has a set 13 of teeth T formed therein at a lower end of the end wall.

Figure 3:
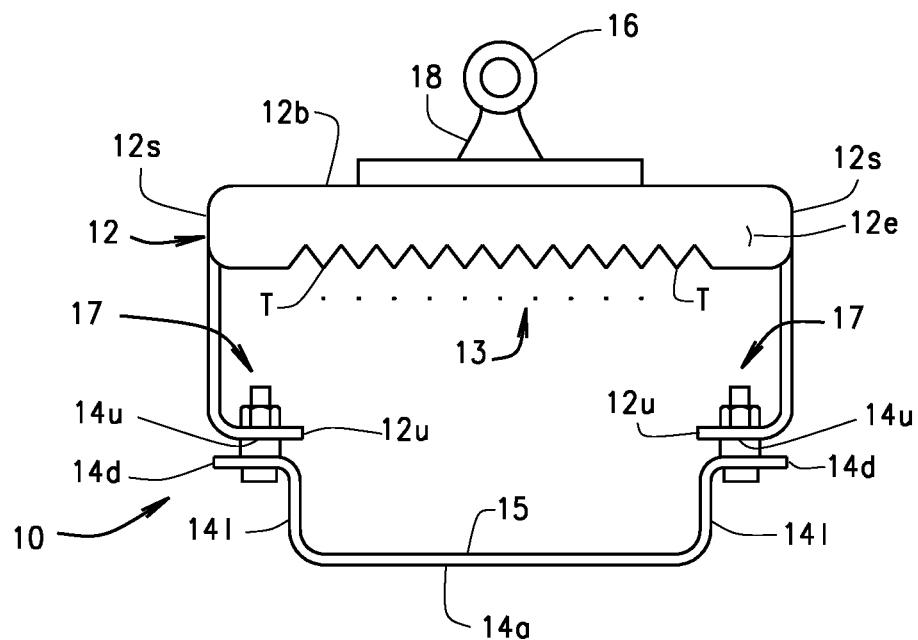
FIG. 3 is an elevation view of the mounting bracket with a boat cleat mounted on it and illustrating the support member and removable clamps; and, FIG. 4 is a bottom plan view of the mounting bracket.
Figure 4:
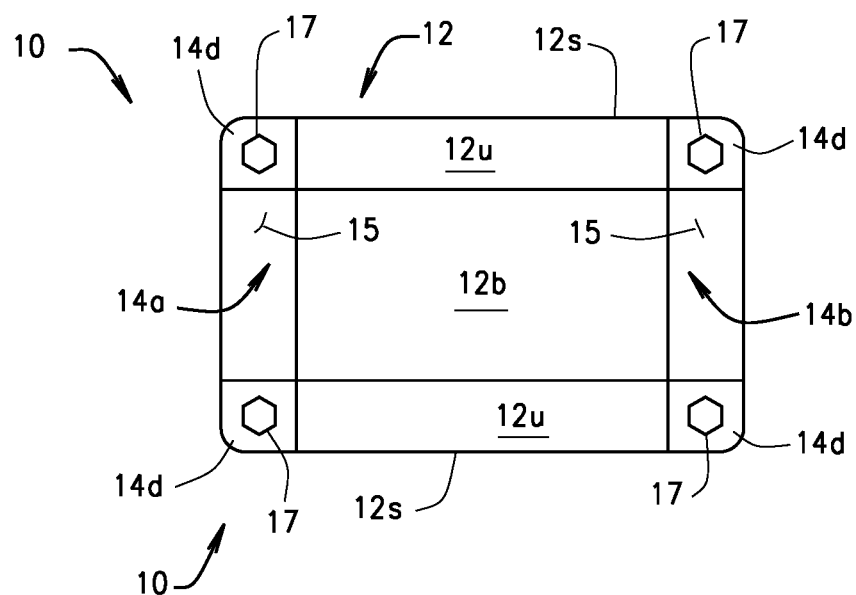

Next, a pair of clamps 14a, 14b is removably attachable to support member 12. As shown in FIG. 3, support member 12 and each clamp 14a, 14b are generally U-shaped. Further, a generally flattened base section 15 of each clamp 14a, 14b corresponds in width to the distance between inner ends of the sidewalls 12s folded underneath base 12b of the support member 12. In addition, the width of each set 13 of teeth T formed in the end walls 12e of support member 12 also correspond in width to the distance between the inner ends of the sidewalls 12s folded underneath the base of support member 12

As represented in the drawings, each end of each clamp 14a, 14b has vertically extending legs 14I to the distal ends 14d of which extend horizontally outwardly. These distal ends are each generally flat and abut against the underside of sections 14u of the sidewalls 12s of support member 12. The underside 12u of the sidewalls 12s, and the distal ends 14d of clamps 14a, 14b have corresponding holes (not shown) formed in them for securing clamps 14a, 14b to support member 12. Clamps 14a, 14b are secured to the undersides 12u by nut and bolt assemblies 17.

Figure 2:
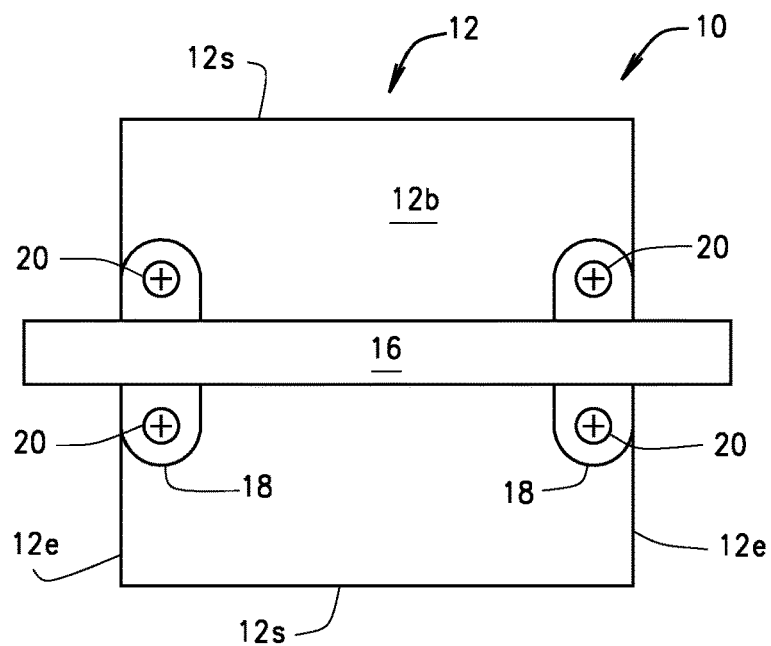
FIG. 2 is plan view of a support member of the mounting bracket with a boat cleat attached to the bracket.

Referring to FIG. 2, a boat cleat 16, when attached to bracket 10, extends longitudinally of support member 12. Cleat 16 extends beyond each end of the support member, and is attached to the support member by supports 18 located at each end of the top of the support member. See FIG. 3. Supports 18 have an inverted T-shape with the base of the support being affixed to the support member by nut and bolt assemblies 20.

Referring to FIG. 1, in use, clamps 14a, 14b are removed from support member 12 when bracket 10 is to be used to install an item on a post. Support member 12 is then held against post P and item I is placed against the post on the opposite side of the post. Once the item is properly positioned, the clamps are reattached to the support member to secure the item in place. This typically requires tightening of the nut and bolt assemblies 17 during which time the teeth T of each set 13 of teeth bite into or engage the post. However, during this installation, the teeth do not penetrate into or puncture the side of the post creating a hole which exposes the side of the post to water and which may cause the post to start to corrode.

When the item is to be removed, the clamps are first removed and the item is taken away. After that, the support member is removed and the clamps re-attached to it so mounting bracket 10 can be stored in a convenient location.

Having thus described the invention, what is claimed and desired to be secured by Letters Patent is:

1. A mounting bracket for securing an item to a post located on a boat dock or other structure adjacent a body of water comprising:
    a support member having a base, sidewalls, and end walls, a lower end of each sidewall folding underneath the base throughout the length of the support member, and each end wall having a set of teeth formed therein at a lower end of the end wall;
    a pair of clamps removably attachable to the support member, the width of the clamps corresponding to the width of the base of the support member with respective ends of each clamp being attached adjacent each respective end of each sidewall on the portion of the sidewall folded underneath the base of the support member to affix an item to the mounting bracket;
    the support member being placed against a sidewall of the post for the respective sets of teeth to penetrate into, but not through, the sidewall of the post with the item to be mounted being placed against the post on an opposite side thereof with the clamps then being fitted over the item and secured to the support member to affix the item to the post without the post having openings made in it by which water can penetrate into the post and result in corrosion to the post.

2. The mounting bracket of claim 1 wherein the support member and each clamp are generally U-shaped.

3. The mounting bracket of 1 wherein a base of each clamp corresponds in width to a distance between inner ends of the sidewalls folded underneath the base of the support member.

4. The mounting bracket of 3 wherein the width of each set of teeth formed in the endwalls of the support member also correspond in width to the distance between the inner ends of the sidewalls folded underneath the base of the support member.

* * * * *